United States Patent
Hartog et al.

(10) Patent No.: US 6,236,542 B1
(45) Date of Patent: May 22, 2001

(54) SUBSTRATE INDEPENDENT SUPERPOLISHING PROCESS AND SLURRY

(75) Inventors: Brent Ray Den Hartog; Dennis Leonard Fox; James Aloysius Hagan; John Chen Shen, all of Rochester, MN (US); Kannimangalam Venkatasubramanyam Viswanathan, West Boro, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/184,718

(22) Filed: Jan. 21, 1994

(51) Int. Cl.[7] .............................. G11B 5/82; B24D 17/00
(52) U.S. Cl. ............................................................ 360/135
(58) Field of Search ..................... 360/135; 428/694 TR, 428/694 SG, 900; 156/638, 663, 665, 664

(56) References Cited

U.S. PATENT DOCUMENTS

| | | |
|---|---|---|
| 4,645,561 | 2/1987 | Rea ...................................... 156/636 |
| 4,835,909 | 6/1989 | Richter et al. .................... 51/281 SF |
| 5,149,338 * | 9/1992 | Fulton ..................................... 51/293 |
| 5,166,006 | 11/1992 | Lal et al. ............................... 428/612 |
| 5,266,376 | 11/1993 | Okazaki et al. ....................... 428/141 |
| 5,340,370 | 8/1994 | Cadien et al. .......................... 51/308 |
| 5,353,182 | 10/1994 | Nakamura et al. .................. 360/104 |
| 5,487,931 | 1/1996 | Annnacone et al. ................ 428/64.1 |
| 5,750,231 * | 5/1998 | Ahlert et al. ......................... 428/65.5 |

FOREIGN PATENT DOCUMENTS

| | | |
|---|---|---|
| 64-19525 * | 1/1989 | (JP) . |
| 4-259908 * | 9/1992 | (JP) . |
| 5-234054 * | 9/1993 | (JP) . |

* cited by examiner

Primary Examiner—Jefferson Evans
(74) Attorney, Agent, or Firm—Steven W. Roth

(57) ABSTRACT

The present invention utilizes a combination of chemical and mechanical finishing processes to polish a disk substrate surface to near atomic smoothness. Broadly speaking, the surface of a disk substrate that has been machined (i.e., rough ground) to a predetermined surface roughness is subjected to attack by a chemical formulation (called an attacking agent). The chemical formulation is used to soften the substrate material. Then, the softened material is "wiped away" via mechanical action.

9 Claims, 8 Drawing Sheets

SUBSTRATE INDEPENDENT SUPERPOLISHING PROCESS AND SLURRY

FIELD OF THE INVENTION

The present invention relates to data processing systems. More particularly, the present invention relates to the polishing of substrate materials for magnetic media.

BACKGROUND OF THE INVENTION

The EDVAC computer system of 1948 is cited by many as the beginning of the computer era. However, well before the introduction of the world's first stored program computer, the concept of mass storage was well known to early technologists such as Herman Hollerith. In fact, without the advent of mass storage devices there may never have been a computer era. It is no surprise, then, that general advances in computer systems are often closely related to advances in mass storage technology.

Today, one of the most popular forms of mass storage technology is the magnetic disk drive. The disks used in these devices are typically constructed by coating a non magnetic material, such as aluminum, with a magnetic material, such as one of the cobalt alloys. The surface of the magnetic disk is then divided into tiny cells which are magnetically encoded to represent one of the two states of a binary digit (i.e., 1 or 0). The magnetic cells are encoded such that they collectively represent information that can be used by a computer system.

Many of today's magnetic disk devices further include at least one magneto resonance head which has a write element and a read element. The write element is used to magnetize the cells (i.e., encode the information), while the read element is used to retrieve the information from the magnetic disk. The head(s) is attached to an armature in much the same way as the needle of a record player is attached to a tone arm. Unlike the needle of a record player, however, the head of a conventional magnetic disk device is designed to be aerodynamic. This allows the head to literally "fly" across the surface of the disk on a cushion of air without actually contacting the disk surface itself. The altitude at which the head flies (i.e., the distance between the head and the disk) is called the "fly-height."

For cost, space, and access speed reasons, the makers of magnetic disk devices have always been looking for ways to place more and more magnetic cells (i.e., information) on smaller and smaller disks. However, this increase in density hinders the ability of the head to discern one cell from another. This problem was initially resolved by reducing the head fly-height to a point where the head could once again distinguish between individual magnetic cells. Now, however, this constant effort to increase cell density is being hindered by the actual surface roughness of the disk itself. Achievable cell density relates to surface roughness in two key ways. The first and most straightforward relationship between achievable cell density and surface roughness is the aforementioned need to reduce head fly-height. It is easy to envision that a head can pass closer to a smooth disk than it can to a rough disk. The second relationship between achievable cell density and surface roughness has to do with how the magnetic cells are placed on the disk. Magnetic cells encoded on a rough surface require more space than magnetic cells which are encoded on a smooth surface. Therefore, the smoother the surface of the disk, the greater the achievable cell density.

This need to reduce surface roughness has caused increased focus on disk finishing and polishing processes. When a disk substrate is initially created, its surface is very rough. The disk substrate is then polished to reduce this surface roughness. Much like abrasive bathroom cleaners, conventional polishing processes commonly use abrasive particles to polish the disk substrate surface until a certain smoothness is achieved. However, the problem with these conventional processes is that the particles used are too large, too hard, and too sharp. It is easy to envision that at some point in the polishing process, particles of this type are causing surface roughness instead of reducing surface roughness. When this point is reached, the polishing process is merely removing additional material without actually reducing surface roughness.

An intuitive solution to this problem is the use of free abrasive particle mixtures (called slurries) that utilize smaller abrasive particles. There are, however, two prohibitive problems associated with the use of very small particles. First, particles that are very small (i.e., less that one micron in size) tend to clump together (i.e., congeal, coagulate, flocculate, and/or agglomerate) such that the benefit of using small particles is lost. Second, small, soft particles lack abrasiveness to the extent that they are practically useless in conventional polishing processes.

At present, the magnetic disk industry is desperately searching for a finishing process that can further reduce the surface roughness of magnetic disk surfaces. Without such a process, increased cell densities are not achievable.

SUMMARY OF THE INVENTION

It is, therefore, a principal object of this invention to provide an enhanced finishing process for disk surfaces.

It is another object of this invention to provide an enhanced Chemical-Mechanical, disk substrate polishing process which uses a slurry that includes soft colloidal particles.

It is still another object of this invention to provide an enhanced slurry which can be used to polish the disk substrate surface by both chemical and mechanical means.

It is yet another object of this invention to provide a hard disk device which has at least one disk substrate with a surface of near atomic smoothness.

It is yet another object of this invention to provide a disk substrate which has a surface of near atomic smoothness.

It is yet another object of this invention to provide a disk substrate which has an enhanced recording surface of near atomic smoothness.

These and other objects of the present invention are accomplished by the substrate independent polishing process and slurry disclosed herein.

The present invention utilizes a combination of chemical and mechanical finishing processes to polish a disk substrate surface to near atomic smoothness. Broadly speaking, the surface of a disk substrate that has been machined (i.e., rough ground) to a predetermined surface roughness is subjected to attack by a chemical formulation (called an attacking agent). The chemical formulation is used to soften the substrate material. Then, the softened material is "wiped away" via mechanical action. As discussed in the background section, mechanical polishing of disk substrates is well known in the magnetic disk art. Damage free chemical polishing of disk substrates, however, is yet to be accomplished because the process parameters have, heretofore, been too difficult to control. Leaving an attacking agent on the substrate for too long causes unacceptable damage to the substrate surface, while leaving an attacking agent on the substrate for too short a period of time defeats the purpose (i.e., material removal).

To overcome this problem, and the inherent problems associated with the use of hard abrasive particles in mechanical polishing, the finishing process of the present invention involves tight control over process parameters and a slurry that comprises soft colloidal particles. When selected appropriately, the relative softness of the colloidal particles combined with their spherical shape and small size make them ideal for damage free removal of the chemically softened material.

In addition to the soft colloidal particles, the slurry used in the present invention is comprised of a polymeric matrix which includes: an attacking agent to soften and loosen the disk substrate material, organic and inorganic stabilizing agents for particle dispersion, and an aqueous carrier that is pH adjusted to be synergistic with the attacking agent.

DETAILED DESCRIPTION

Figure 1:
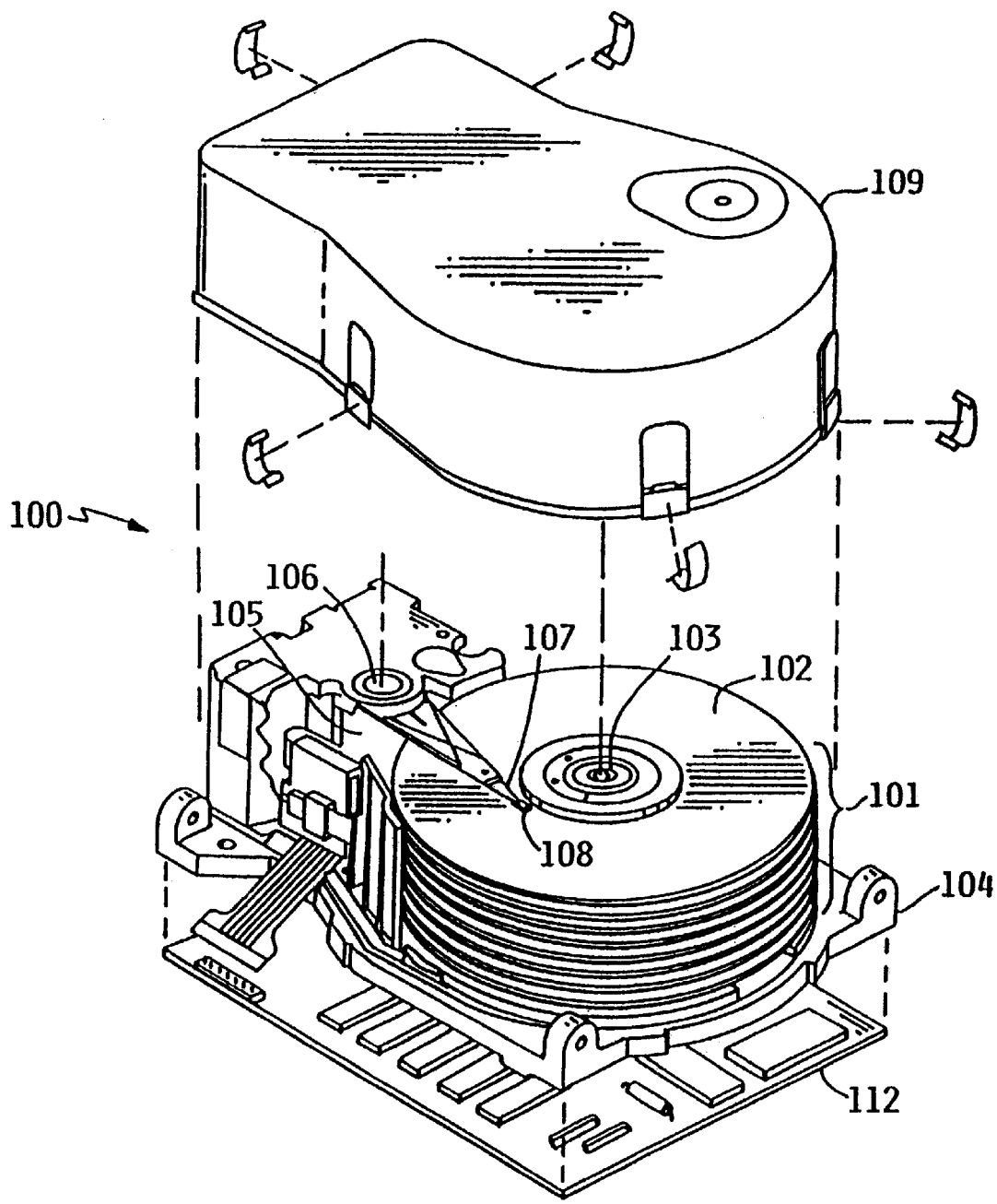
FIG. 1 shows a magnetic disk drive utilizing a disk substrate that has been polished in accordance with the present invention.

FIG. 1 shows magnetic disk drive 100 utilizing magnetic disks with disk substrates that have been polished in accordance with the preferred embodiment of the present invention. Each of disks 101 comprises a disk substrate that has been coated with a magnetic material. Disks 101, which further comprise magnetic surface 102, are rigidly attached to common hub or spindle 103, which is mounted on base 104. Spindle 103 and disks 101 are driven by a drive motor (not visible) at a constant rotational velocity. Comb-like actuator assembly 105 is situated to one side of disks 101. Actuator 105 rotates through an arc about shaft 106 parallel to the axis of the spindle, driven by an electromagnet, to position the transducer heads. Cover 109 mates with base 104 to enclose and protect the disk and actuator assemblies.

Electronic modules for controlling the operation of the drive and communicating with another device, such as a host computer, are contained in circuit card 112, typically mounted outside the enclosure. A plurality of head/suspension assemblies 107 are rigidly attached to the prongs of actuator 105, one head/suspension assembly 107 corresponding to each disk recording surface 102. Typically, data is recorded on both surfaces of the disk, making two opposed head/suspension assemblies for each disk. An aerodynamic transducer head 108 is located at the end of each head/suspension assembly 107 adjacent the disk surface. Head/suspension assembly 107 is essentially a beam spring tending to force transducer head 108 against the surface of the disk 102. The aerodynamic characteristics of the head counteract the force of the beam spring, making the head "fly" a small distance from the surface of the disk due to air movement caused by the spinning disk.

Figure 2A:
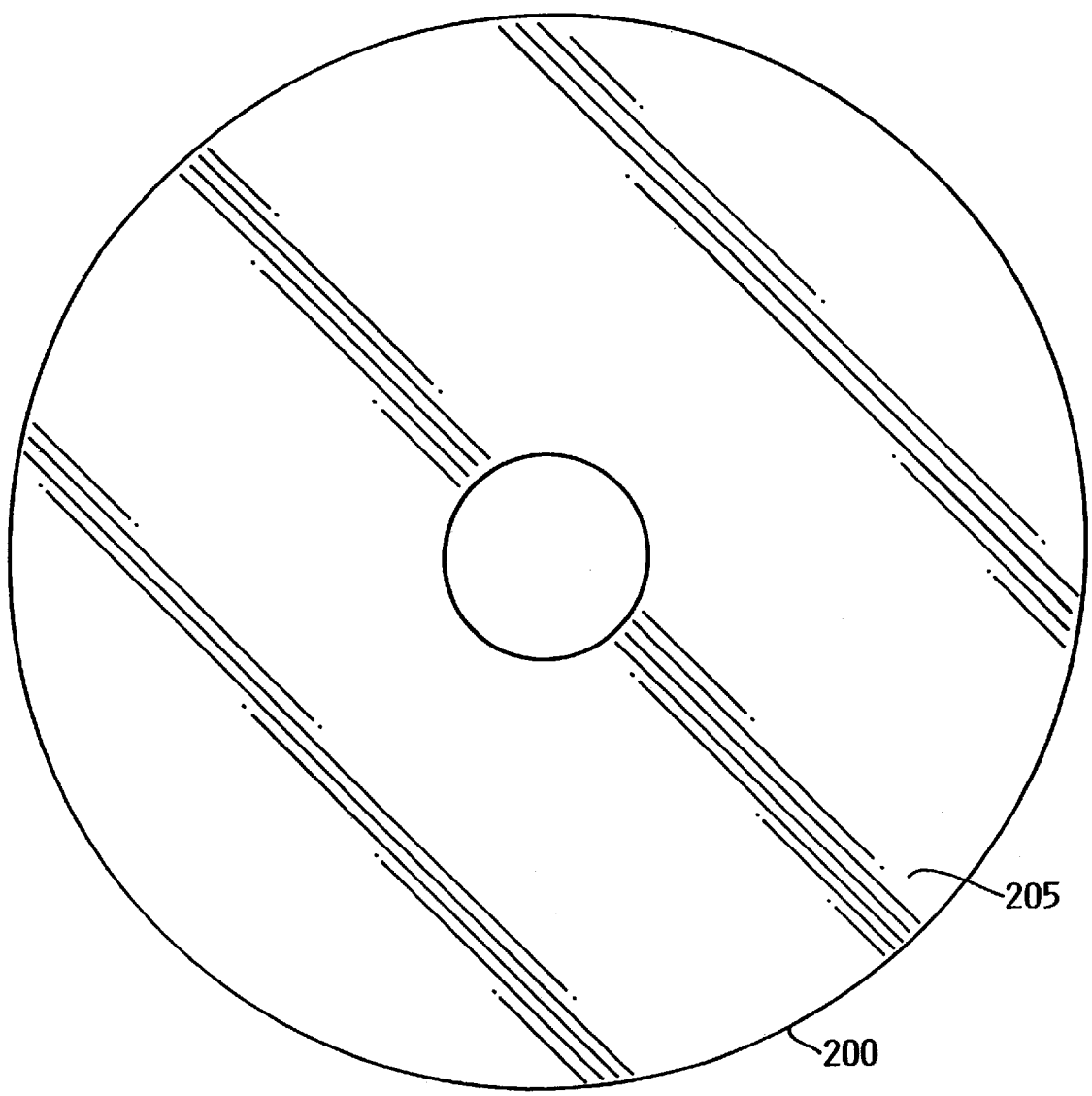
FIG. 2A shows a disk substrate that has been polished in accordance with the present invention.

FIG. 2A shows a disk substrate that has been polished in accordance with the present invention. Disk substrate 200, which has disk substrate surface 205, has a substrate material which comprises aluminum coated with a layer of Nickel Phosphorous (NiP). NiP is commonly used in the magnetic disk art to provide a hard, rigid, defect free surface to otherwise malleable or inclusioned substances like aluminum. A common substrate material has been chosen for the preferred embodiment to best illustrate the teachings of the present invention. However, it should be understood that the present invention is not limited to just NiP coated aluminum. Other substrate materials such as glass, titanium, carbon, zirconium, silicon carbide and NiP coated Beryllium could also be used. Therefore, "magnetic disk substrate" is defined herein to refer to disk substrates that are constructed using any one of the aforementioned substrate materials. It should further be understood that the present invention is not limited to magnetic disk substrates. The present invention is equally applicable to magnetic disks made entirely of magnetic material.

Figure 2B:
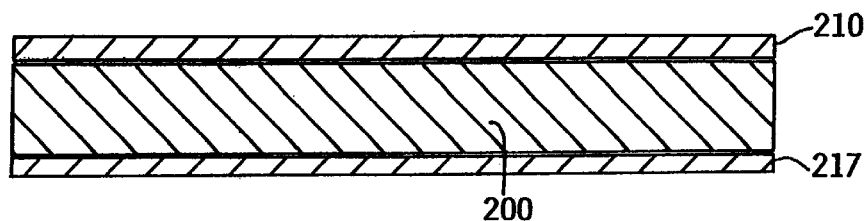
FIG. 2B shows a cross section view of the disk substrate shown in FIG. 2A.

FIG. 2B shows a cross section view of disk substrate 200. As shown, disk substrate 200 is comprised of top NiP layer 210 and bottom NiP layer 217 which are 10 micrometer ($\mu$m) thick and aluminum layer 215 which is 0.8 mm thick.

Figure 2C:
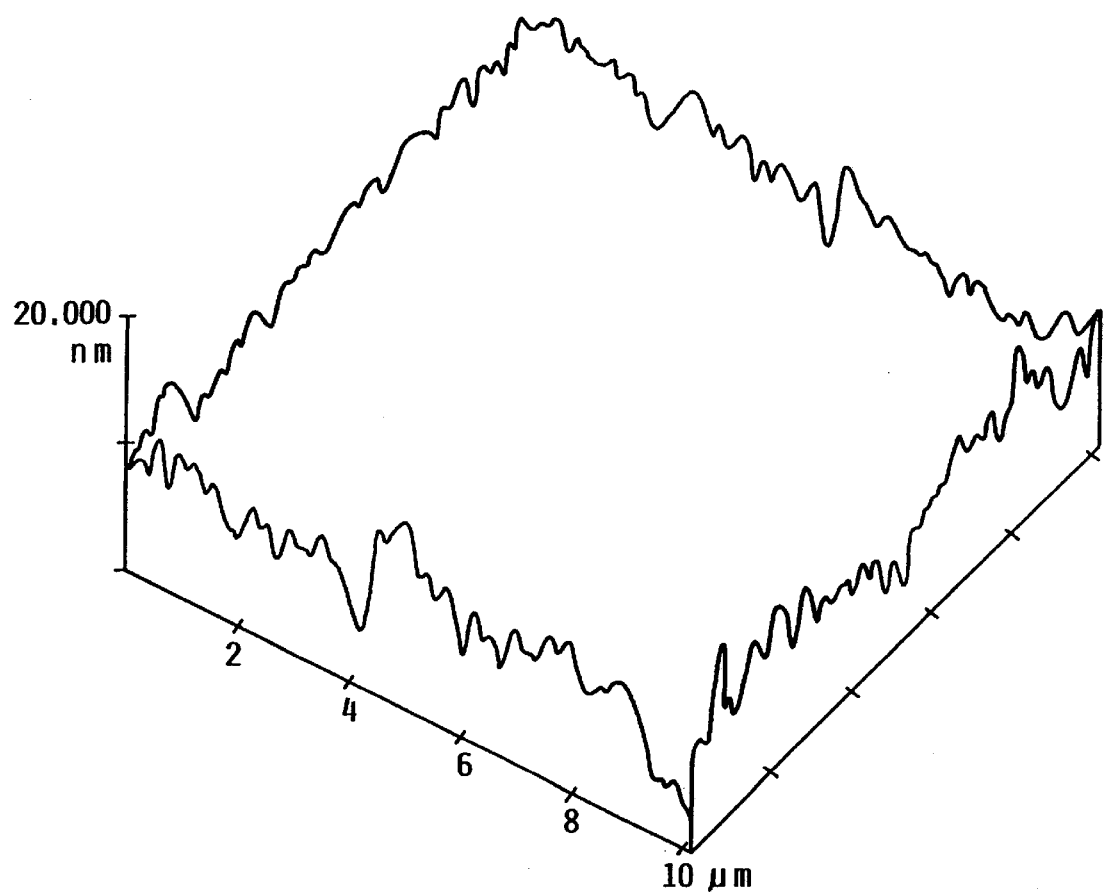
FIG. 2C shows a microscopic view of a disk substrate surface that has been rough ground.

FIG. 2C shows a microscopic view of a disk substrate surface that was polished using a conventional, hard particle polishing process. FIGS. 2C through 2F and the measurements displayed thereon were produced by a NanoScope III microscope which is commercially available through Digital Instruments Corporation. The NanoScope III used for the measurements described herein has been calibrated in accordance with NIST 20 & 40 nanometer step height standards. Atomic Force Microscopes, like the NanoScope III microscope, are capable of displaying and measuring surface roughness at the atomic level.

Figure 2D:
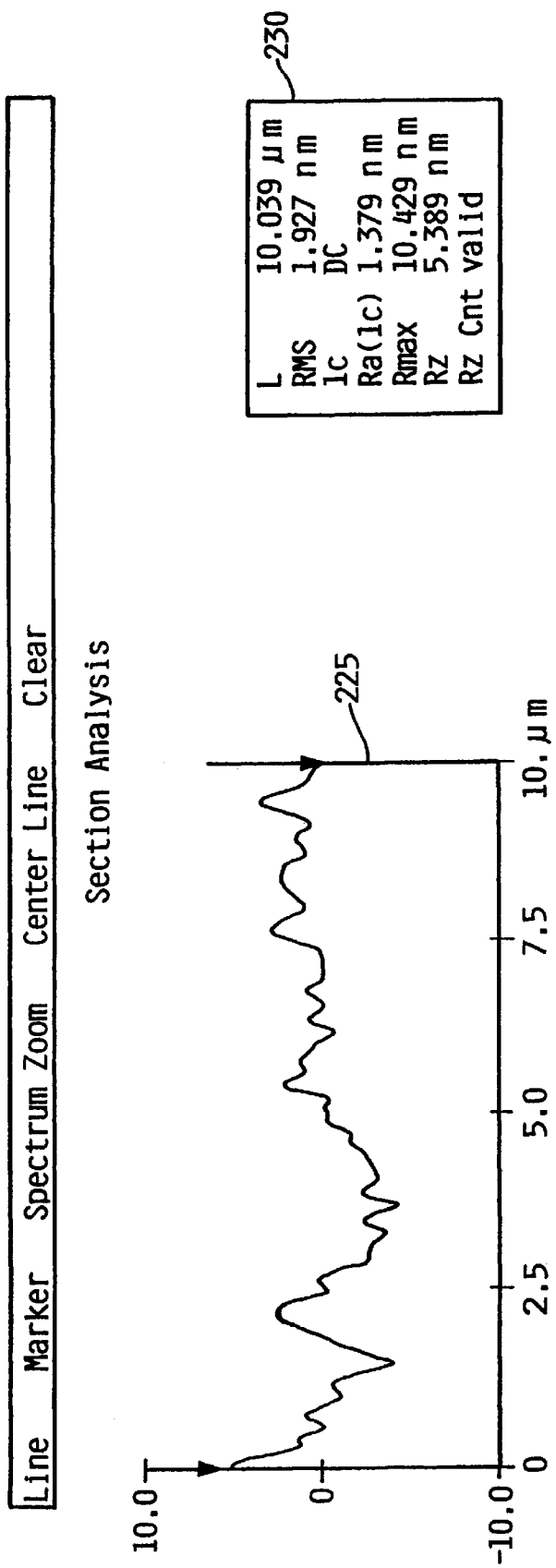
FIG. 2D shows a graphical view of the surface roughness of the disk substrate surface of FIG. 2C.

Graph 225 and table 230 of FIG. 2D show surface roughness measurements for the disk substrate surface shown in FIG. 2C. Table 230 shows that the average surface roughness of the disk substrate surface shown in FIG. 2C is approximately 19 Angstroms (A) [i.e., shown as rms. value 19.27 A].

Figure 2E:
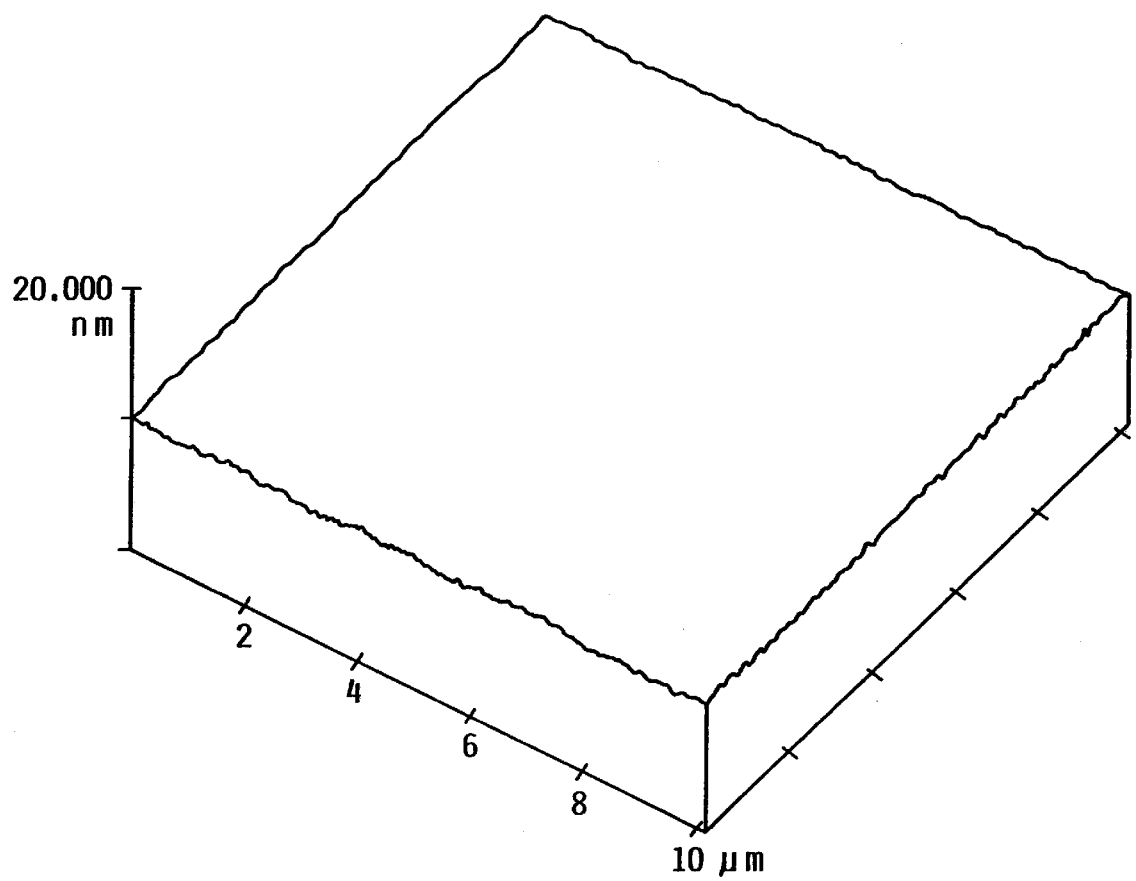
FIG. 2E shows a microscopic view of a disk substrate surface after the disk substrate has been polished in accordance with the present invention.
Figure 2F:
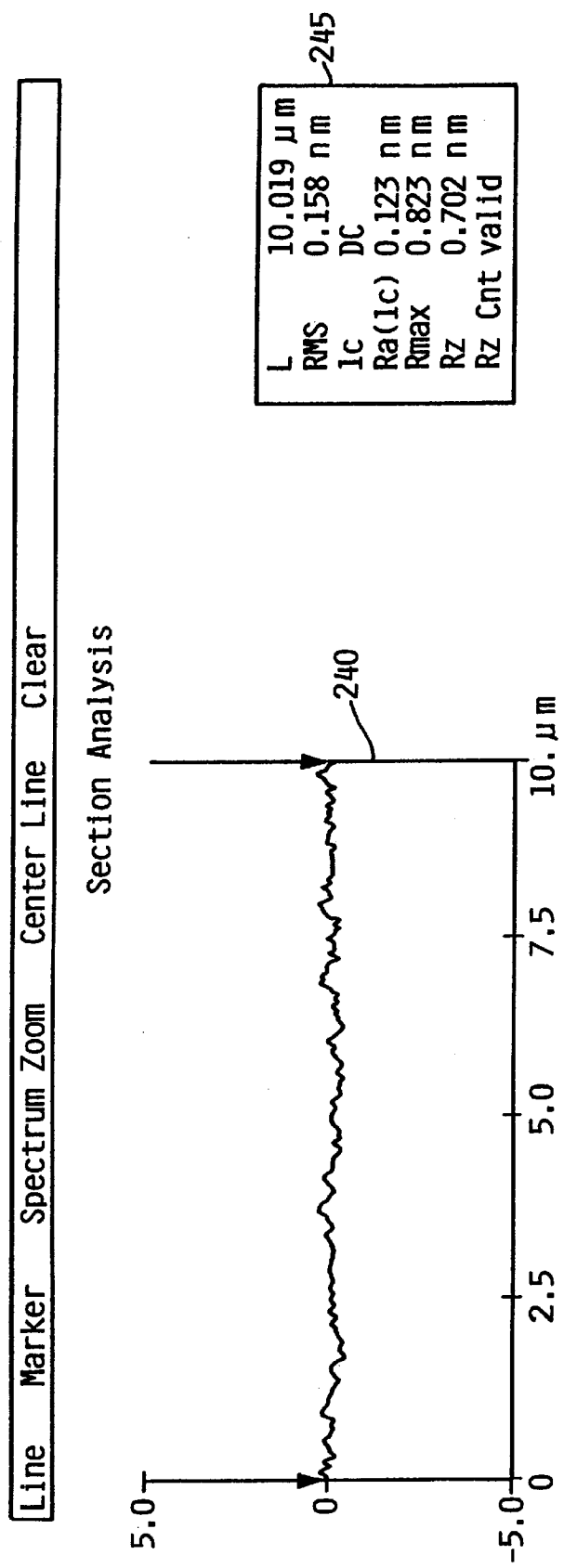
FIG. 2F shows a graphical view of the surface roughness of the disk substrate surface of FIG. 2E.

FIG. 2E shows a microscopic view of disk substrate surface 205 which was polished in accordance with the present invention. Simple visual comparison of the disk substrate surface shown in FIG. 2C and that of disk substrate surface 205 shows a marked difference in surface roughness. Graph 240 and table 245 show surface roughness measurements for disk substrate 205. Table 245 shows that the average surface roughness of disk substrate 205 is an order of magnitude less than that of the disk substrate surface shown in FIG. 2C [i.e., shown as rms. value 1.58 A].

SuperPolishing Process
Polishing Machine and Process Parameters

Figure 3:
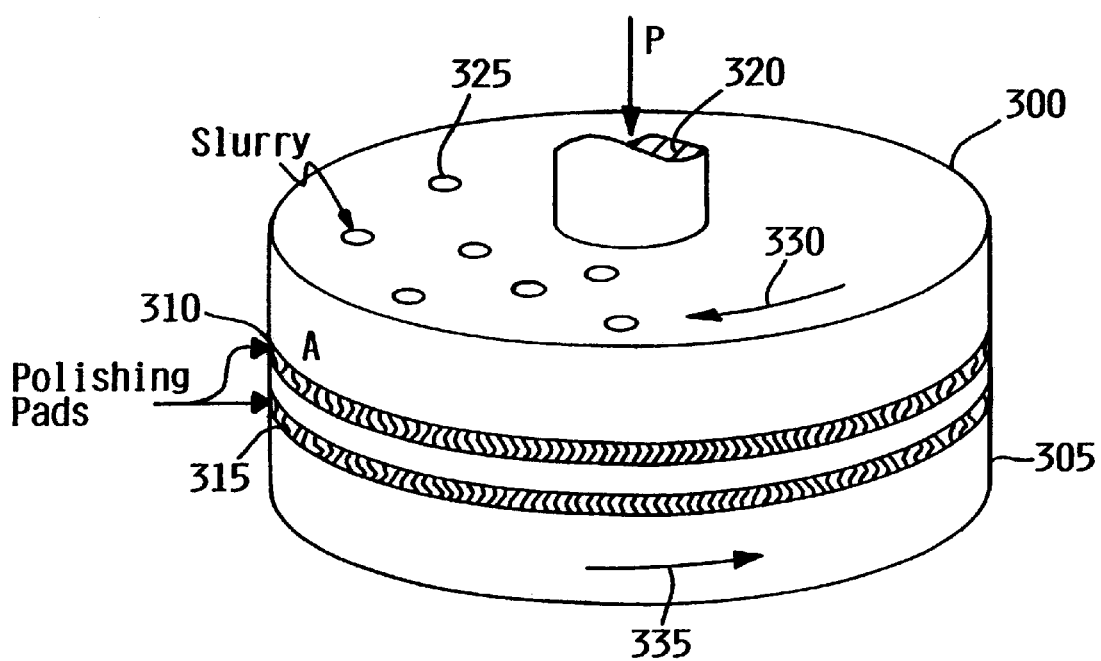
FIG. 3 shows how the polishing pads of the preferred embodiment operate to generate polishing action.

The polishing machine of the preferred embodiment is a three motor, 9B-5P SpeedFam Double-Sided Polishing Machine made by SpeedFam Corporation. However, other conventional polishing machines could also be used. The double-sided polishing action of typical double sided polishing machines is shown on FIG. 3. Individual disk substrates are held between polishing pads 310 and 315 by polishing plates 300 and 305. The polishing pads used in the preferred embodiment are Ultra-Pol V polishing pads made by Rippey Corporation; however, other polishing pads with similar characteristics could also be used. While pressure is applied axially to shaft 320, polishing plates 300 and 305 are rotated in opposite directions (shown by rotation arrows 330 and 335). The pressure applied to shaft 320 should be set to 0.052 kg/cm2 of disk area (for 48 mm disks). Lower polishing plate 305 and attached polishing pad 315 should be set to rotate at 60 RPM, while upper polishing plate 300 and attached polishing pad 310 should be set to rotate at 20.0 RPM.

Slurry supply ports, such as slurry supply port 325, are used to introduce the slurry onto the disk substrates. As a result of this double-sided polishing action, both the top and bottom sides of the disk substrates are polished simultaneously.

Figure 4:
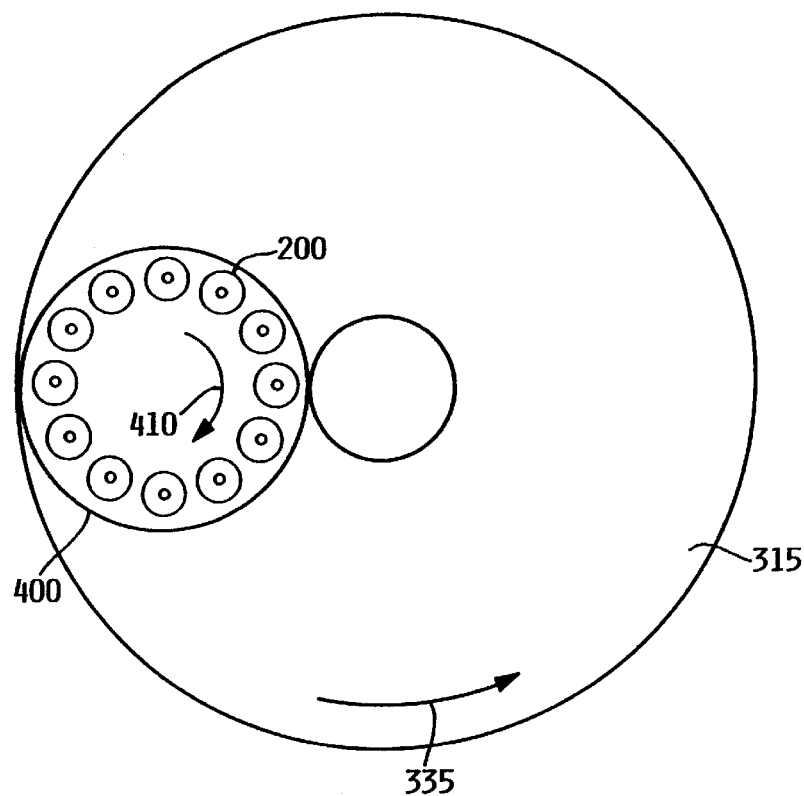
FIG. 4 shows how the disk substrate carriers of the preferred embodiment operate in relation to polishing pads to generate polishing action.

FIG. 4 shows how the disk substrate carriers (such as disk substrate carrier 400) operate in relation to lower polishing pad 315 and upper polishing pad 310. Disk substrate carrier 400 rotates in the same direction as polishing pad 315 (shown by rotation arrow 410) and in the direction opposite to polishing pad 310 [not shown] such that disk substrates (such as disk substrate 200) are polished on both sides.

Figure 5:
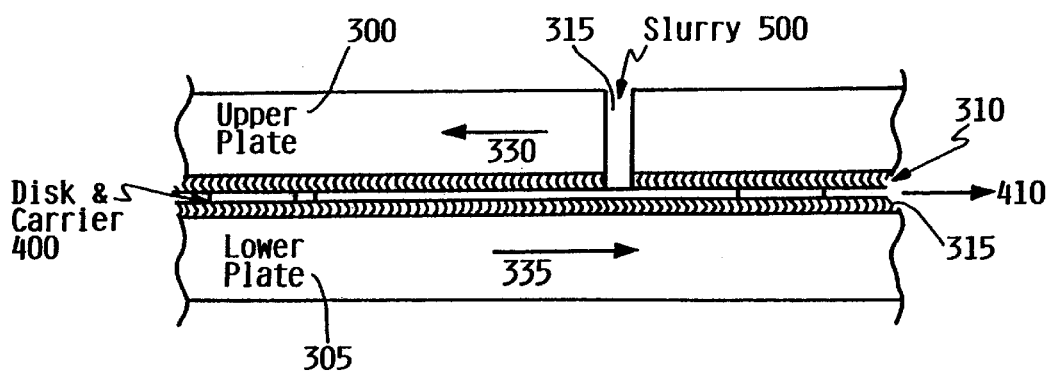
FIG. 5 shows how slurry is introduced onto disk substrates in accordance with the preferred embodiment.

FIG. 5 shows how slurry 500 is introduced onto disk substrates during polishing. As soon as the polishing process is begun, Slurry 500 is introduced onto disk substrates via slurry supply ports like slurry supply port 325. Slurry 500 is introduced onto disk substrates at a rate of 30 ml per minute. Slurry 500 then attacks the surface of the disk substrates [not shown] located in disk substrate carrier 400. Once slurry 500 has softened the disk substrate material, the excess material is removed from the disk substrate by the polishing action of polishing pads 310 and 315. Under the above process parameters, the processing time is less than 10 minutes. Near the end of the process, rinse water should be introduced onto the disk substrates to dilute slurry 500 and increase the pH. The pH should be increased to a value at or above 3.0 before the rotation is stopped. Too short of a rinse time may cause pitting of the disk substrate surface which may lower the quality of the finish. In the preferred embodiment, a rinse time of 40 seconds is used.

Controlling Hard Particle Contamination

Hard particle contaminants which are inadvertently introduced into slurry 500 can cause scratches on the surface of disk substrate 200. Since information cannot be stored in locations that have been scratched, the fewer the defects the better. Therefore, it is extremely important to minimize the extent to which hard particles are introduced into slurry 500. In the preferred embodiment, fine filtration of slurry 500 is used to control hard particles that may be inadvertently introduced into slurry 500. Slurry 500 is continuously circulated through a 3 micron filter by a circulating pump that is capable of operating at pressures up to 100 psi. [not shown].

Composition of Slurry 500

Attacking Agents and pH

The chemical polishing portion of this chemical-mechanical process is achieved through the use of an attacking agent. Since disk substrate 200 is coated with NiP, aluminum nitrate is used as an attacking agent to soften the surface of disk substrate 200. In addition, the pH of slurry 500 is adjusted to be acidic by adding nitric acid. However, it will be understood by those skilled in the art that the particular attacking agent used varies with the type of substrate involved. For example, if disk substrate 200 had been made of glass instead of being coated with NiP, cerium sulfate would have been used as an attacking agent and the pH of slurry 500 would have been adjusted to be acidic through the use of sulfuric acid. Accordingly, it should be understood that the present invention is not limited to a particular attacking agent or a particular substrate type. Additionally, it should be understood that there will be an optimum pH value that varies depending upon the particular combination of substrate type, attacking agent, and colloidal particle. When slurry 500 comes into contact with the surface of disk substrate 200, it reacts with the NiP and softens the metal such that it can be easily removed through mechanical action.

Colloidal Particles for Substrate Material Removal

After the surface of disk substrate 200 has been softened, soft colloidal particles are used to mechanically remove the softened layer. Typically, particles are said to range in size from 1 millimeter in diameter to 0.001 $\mu$m in diameter. Particles can be broadly categorized into two groups:

| Particle Category | Particle Size |
|---|---|
| Coarse | Greater than 1 $\mu$m |
| Colloidal | Between 1 $\mu$m and .001 $\mu$m |

As discussed in the background section, use of large, hard particles for polishing causes scratches on the surface of the disk substrate. Hence, the smaller the particles the better. However, the smallest colloidal particles can be too small to remove the softened material. Hard colloidal particles are similarly ineffective because they leave a scratched or rougher surface. For these reasons, soft colloidal particles of intermediate size were chosen for slurry 500. While the type of colloidal particle used in the preferred embodiment is colloidal silica, it will be appreciated by those skilled in the art that the present invention is not limited to the particular type of colloidal particle used in the preferred embodiment. Other types of colloidal particles with similar characteristics could also be used.

Stabilization Agent

Since colloids are thermodynamically unstable, the method for stabilizing slurry 500 is important. In a manufacturing environment, slurry 500 must remain stable while circulating through the 3 micron filter. In the preferred embodiment, this is accomplished by using organic or inorganic agents to enhance the electrical double layer charge and/or provide steric hindrance to maintain dispersion of the colloidal particles.

| Preparation of Slurry 500 NiP Substrate Material | |
|---|---|
| Ingredient | Amount |
| 2360 Nalco Colloidal Silica | 10 liters |
| Deionized Water | 10 liters |
| 50%/50% Nitric Acid & Deionized Water | 250 ml. |
| Aluminum Nitrate | 1 Kg. |

For NiP substrates (such as disk substrate 200), the preparation of slurry 500 begins with 10 liters of Nalco 2360

Colloidal Silica made by Nalco Corporation and 10 liters of deionized water. While the colloidal silica used in the preferred embodiment is made by Nalco Corporation, it will be understood by those skilled in the art that the present invention is not limited to any particular brand of colloidal silica. Other commercially available colloidal silica products, such as Ludox from Dow Corning Corporation, could also be used. 1 Kg of aluminum nitrate is then dissolved into the deionized water. Once this is accomplished, nitric acid is added to the deionized water until the pH is close to 1.0. When the preparation of the deionized water is complete, the 10 liters of the Nalco 2360 Colloidal Silica is aggressively mixed with nitric acid until this solution's pH is also close to 1.0. The two solutions (i.e., the aluminum nitrate solution and the Nalco 2360 solution) are then mixed together to form slurry 500. The pH of slurry 500 is then adjusted to be approximately 0.9.

| Glass Substrate Material | |
| --- | --- |
| Ingredient | Amount |
| 2360 Nalco Colloidal Silica | 7 liters |
| Warm Deionized Water | 3 liters |
| Sulfuric Acid | 250 ml. |
| Cerium Sulfate | 7.5 grams. |

As mentioned, the present invention is not limited to the type of substrate material involved. For example, if disk substrate 200 were a glass substrate instead of a NiP substrate, the preparation of slurry 500 would begin with 7 liters of the Nalco 2360 Colloidal Silica and 3 liters of warm deionized water. The de ionized water is adjusted to pH 2.0 with sulfuric acid. Then, 7.5 grams of cerium sulfate are dissolved in it. The pH of the sulfuric acid solution is then adjusted to be between 0.6 and 0.9. When the preparation of the sulfuric acid solution is complete, the 7 liters of the Nalco 2360 Colloidal Silica is aggressively mixed with sulfuric acid until this solution's pH is also between 0.6 and 0.9. The two solutions are then mixed together to form slurry 500. The pH of slurry 500 is then adjusted such that it is between 0.6 and 0.9.

Regardless of the substrate material involved, it is important to note that the final pH and the concentrations of the ingredients are important in controlling the rate at which material is removed from disk substrate 200. High levels of an attacking agent can cause pitting on the surface of disk substrate 200, while lower levels of the attacking agent slow down the rate at which material is removed (i.e., the stock removal rate) from disk substrate 200. This, of course, increases processing time. In addition, the stock removal rate also tends to decrease with higher pH values.

Although a specific embodiment along with some alternate embodiments have been disclosed, it will be understood by those skilled in the art that additional variations in form and detail may be made within the scope of the following claims.

What is claimed is:

1. A magnetic disk drive, said magnetic disk drive comprising:

a spindle;

a comb-like actuator assembly; and at least one disk, said at least one disk being rigidly attached to said spindle and comprising substrate material and magnetic material, said substrate material having a surface roughness of less than 4 Å, said substrate material being selected from a group consisting of glass and aluminum coated with Nickel Phosphorous.

2. The magnetic disk drive of claim 1 wherein substrate material has a surface roughness of less than 3 Å.

3. The magnetic disk drive of claim 2 wherein substrate material has a surface roughness of less than 2 Å.

4. A magnetic disk substrate, said magnetic disk substrate comprising:

substrate material having a surface roughness of less than 4 Å, said substrate material being selected from a group consisting of glass and aluminum coated with Nickel Phosphorous.

5. The magnetic disk substrate of claim 4 wherein said substrate material has a surface roughness of less than 3 Å.

6. The magnetic disk substrate of claim 5 wherein said substrate material has a surface roughness of less than 2 Å.

7. A data storage device, said data storage device comprising:

magnetic material, said magnetic material having at least one surface, said at least one surface having a surface roughness less than 4 Å, said substrate material being selected from a group consisting of glass and aluminum coated with Nickel Phosphorous.

8. The data storage device of claim 7, where in said at least one surface has a surface roughness of less than 3 Å.

9. The data storage device of claim 8, where in said at least one surface has a surface roughness of less than 2 Å.

* * * * *